June 11, 1940.  J. PIERIK  2,203,967
ROTARY TOOL CHUCK
Filed Nov. 29, 1937
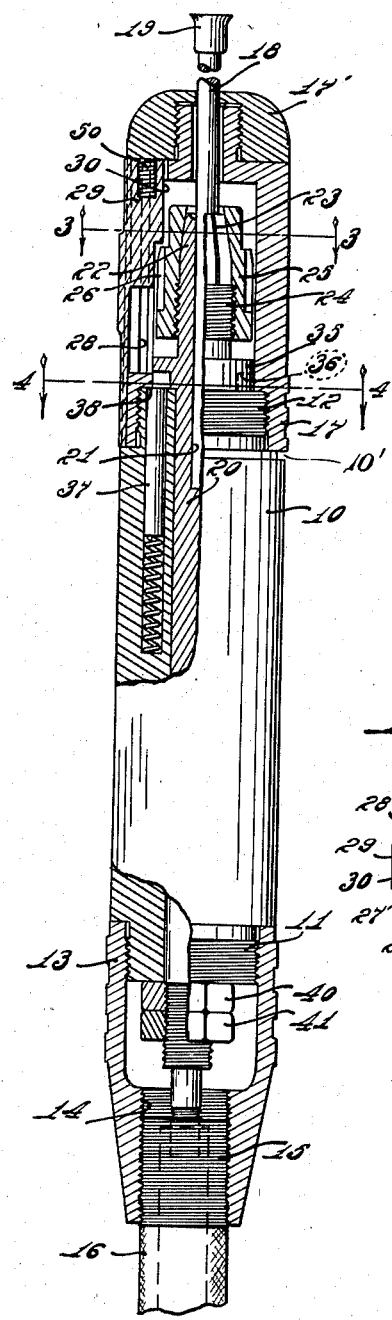
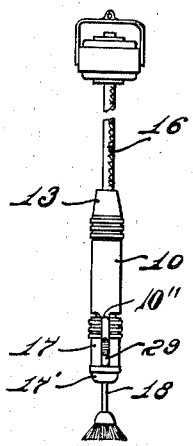
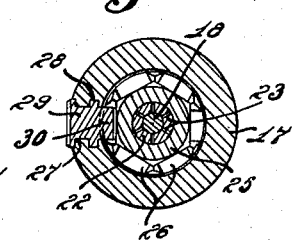
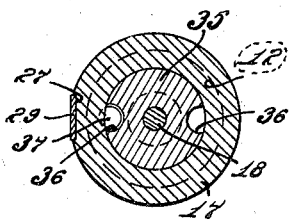
INVENTOR.
Jan Pierik,
BY Hood + Hahn.
ATTORNEYS.

Patented June 11, 1940

2,203,967

UNITED STATES PATENT OFFICE 2,203,967

ROTARY TOOL CHUCK

Jan Pierik, Indianapolis, Ind.

Application November 29, 1937, Serial No. 176,977

5 Claims. (Cl. 32—26)

An object of my invention is to provide an improved chuck for rotary tools.

Another object of my invention is to provide a chuck for rotary tooth cleansing tools whereby either natural or artificial dentures may be readily and thoroughly cleansed by non-professional users than by means now currently available.

The accompanying drawing illustrates an embodiment of my invention.

Fig. 1 is an axial section, somewhat enlarged, with an adjacent end of a flexible drive shaft;

Fig. 2 an elevation, on a smaller scale of a complete equipment for household use, including my improved chuck, a flexible drive shaft, and an electric motor;

Fig. 3 a section on line 3—3 of Fig. 1; and

Fig. 4 a section on line 4—4 of Fig. 1.

In the drawing 10 indicates the main tubular body ensmalled and threaded at the ends 11 and 12. Threaded on 11 is a tubular shell 13 internally threaded at 14 to receive a threaded fitting 15 at one end of the non-rotative shell of a common flexible drive shaft 16.

Threaded on 12 is a tubular shell 17, supplemented by a cap 17', perforated at its outer end to permit the entry of the shank 18 of a tool 19 to be rotated.

Journalled in the bore of body 10 is a shaft 20 having, at one end within shell 17, an axial bore 21 to receive shank 18, the end portion being externally tapered at 22 and axially split at several circumferentially spaced lines, as indicated at 23. Just back of the tapered portion 22, shaft 20 is threaded at 24 to receive the chuck compressor 25 which is internally tapered to fit portion 22 and compress the bore 21 to clamp shank 18. Compressor 25 is provided externally with one or more axially extended grooves 26 open at one end.

The wall of shell 17 is axially slotted from end to end, at 27, and the side walls of the slot are provided with key ways 28 in which is splined a key 29 provided with a portion 30 adapted to enter any one of the grooves 26 so that compressor 25 may partake of any rotative movement of shell 17 relative to body 10.

Key 29 is the full length of shell 17 so that, when said shell is seated against body 10 and cap 17' is in place, the key cannot be shifted and its portion 30 is free from compressor 25 and the compressor is free to rotate with shaft 20.

A portion of the periphery of body 10 immediately adjacent the inner end of shell 17, to a depth equal to or greater than the radial dimension of the adjacent end of key 29, is cut away, as indicated at 10', throughout the greater portion of the circumference and axially sufficient to permit key 29 to interlock with teeth 26, thus leaving the lug 10'' (Fig. 2) for engagement by the inner tip of key 29 when shell 17 is fully seated on body 10. As soon as shell 17 is backed off on threads 12 enough to swing key 29 away from lug 10'', the key will be shifted by spring 50 to interlock with teeth 26, so that further rotation of shell 17, in the proper direction, will withdraw compressor 25 from the gripping fingers 22.

Shaft 20 is provided with a collar 35 which abuts the forward end of body 10 and this collar is provided with pockets 36 facing body 10 and adapted to receive the spring pressed locking pin 37 mounted to slide axially in body 10. The outer end of pin 37 is exposed for contact with an internal shoulder 38 of body 10 so that, when said shell is seated against body 10, pin 37 will be moved back into body 10 to free shaft 20 for rotation. Shaft 20 is held axially in place by nut 40 and check nut 41.

The flexible drive shaft structure 15—16 may be conveniently driven from a small electric motor mounted on a bath room wall.

Any one of a series of tools 19, such as brushes of various shapes and stiffness, massage cups, etc., such as are commonly used by dentists in their dental engines for cleansing natural dentures and massaging gums, may be interchangeably mounted in my chuck.

To perform this operation, shell 17 is backed off from body 10 enough to permit key 29 to be shifted into engagement with compressor 25 whereupon further backing off of the shell 17 operates to turn compressor 25 on shaft 20 to release the tool. Backing off of shell 17 permits the locking pin 37 to enter a pocket 36 to prevent rotation of shaft 20.

Another tool being inserted in bore 21, shell 17 is returned to abutment on body 10, the first portion of the movement turning compressor 25 on shaft 20 to clamp the shank of the tool, thereafter bringing the projected end of key 29 against portion 10 to move the key out of engagement with the compressor, and bringing shoulder 38 against locking pin 37 and shifting said pin out of pocket 36 to release shaft 20 for rotation.

It will be noted that, when shell 17 is seated against body 10, key 29 is held against displacement so that compressor 25 cannot be accidentally released. Also that, when shell 17 is backed away from body 10 preparatory to engagement of 29 with 25, the locking pin 37 is automatically released to lock shaft 20 during manipulation of the chuck compressor.

When all of the parts are in operative position body 10 and shells 13 and 17 form a unitary structure of convenient size and shape to be held in the hand and no exposed part is rotative with shaft 20.

While my improved chuck has been primarily designed as part of a "non-professional dental equipment," it will be readily apparent that it will be useful for other purposes and types of tools.

If automatic actuation of the key 29 is desired, a spring 50 is interposed between said key and cap 17' so that, when shell 17 is backed away from the main body, the spring will automatically project the key into one of the keyways of the compressor.

I claim as my invention:

1. A tool holder comprising, a main tubular body, a shaft journalled therein with a tool-receiving chuck at one end and a power-receiving portion at the other end, a compressor threaded on the shaft to engage the chuck, a shell threaded on the main body and encompassing the chuck and compressor, and a key carried by said shell and accessible from the exterior thereof and movable into and out of non-rotative interlock with the compressor, and a locking pin carried by the main body movable into and out of non-rotative interlock with the shaft and engageable by the shell to be moved out of said interlock by axial movement of the shell on the main body.

2. A tool holder comprising, a main tubular body, a shaft journalled therein with a tool-receiving chuck at one end and a power-receiving portion at the other end, a compressor threaded on the shaft to engage the chuck, a shell threaded on the main body and encompassing the chuck and compressor, and a key axially slidable in the shell accessible from the outside and axially movable into and out of non-rotative interlock with the compressor.

3. A tool holder of the character specified in claim 2 and comprising a locking pin carried by the main body movable into and out of non-rotative interlock with the shaft and engageable by the shell to be moved out of said interlock by movement of the shell on the main body.

4. A tool holder comprising, a main tubular body, a shaft journalled therein with a tool-receiving chuck at one end and a power-receiving portion at the other end, a chuck-operating member threaded on the main body, a locking pin carried by the main body movable into and out of non-rotative interlock with the shaft, and engageable by the said chuck-operating member to be moved thereby out of its interlock with the shaft by movement of said member.

5. A tool holder comprising, a main tubular body a shaft journalled therein with a tool-receiving chuck at one end and a power-receiving portion at the other end, a member rotatably threaded on the main body, a locking pin carried by the main body movable into and out of non-rotative interlock with the shaft, and engageable by the said member to be moved upon rotation of said member out of its interlock with the shaft by movement of said member.

JAN PIERIK.